US010002004B2

(12) United States Patent
Foster

(10) Patent No.: US 10,002,004 B2
(45) Date of Patent: Jun. 19, 2018

(54) STREAM COMPUTING APPLICATION SHUTDOWN AND RESTART WITHOUT DATA LOSS

(71) Applicant: International Business Machines Corporation, Armonk, NY (US)

(72) Inventor: Kevin F. Foster, Danville, CA (US)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 15/164,903

(22) Filed: May 26, 2016

(65) Prior Publication Data

US 2017/0344382 A1 Nov. 30, 2017

(51) Int. Cl.
| | |
|---|---|
| *H04L 29/08* | (2006.01) |
| *G06F 9/44* | (2018.01) |
| *G06F 12/0804* | (2016.01) |
| *H04L 29/14* | (2006.01) |
| *G06F 11/14* | (2006.01) |
| *G06F 9/48* | (2006.01) |

(52) U.S. Cl.
CPC ............ *G06F 9/442* (2013.01); *G06F 9/4406* (2013.01); *G06F 12/0804* (2013.01); *H04L 29/14* (2013.01); *H04L 67/14* (2013.01); *G06F 9/485* (2013.01); *G06F 11/1438* (2013.01); *G06F 2212/1032* (2013.01); *G06F 2212/60* (2013.01)

(58) Field of Classification Search
CPC ...... H04L 67/14; H04L 29/14; G06F 11/1438; G06F 9/485
See application file for complete search history.

(56) References Cited

U.S. PATENT DOCUMENTS

| | | | | |
|---|---|---|---|---|
| 5,909,540 A | * | 6/1999 | Carter | ............... G06F 9/5016 707/E17.12 |
| 6,304,981 B1 | * | 10/2001 | Spears | ............... G06F 11/004 714/22 |

(Continued)

OTHER PUBLICATIONS

Stewart, R., et al. Sockets API extensions for the stream control transmission protocol (SCTP). No. RFC 6458. 2011.*

(Continued)

*Primary Examiner* — Jimmy H Tran
(74) *Attorney, Agent, or Firm* — North Shore Patents, P.C.; Michele Liu Baillie

(57) ABSTRACT

In a stream computing application shutdown, a shutdown message is received by a source operator of the stream computing application. In response, the source operator stops acquiring data from external sources, sends any cached data to an output queue of the source operator, sends the shutdown message to the output queue of the source operator, and sends the cached data and shutdown message to an input queue of another operator in the stream computing application. The source operator then terminates. In response to receiving the shutdown message, the other operator completes the processing of data in its input queue and sends any outputs from the processing of the data in its input queue to one or more output destinations. The other operator then terminates. In this manner, a stream computing application may be shut down while ensuring that any already inputted data is processed to completion, thus avoiding data loss.

18 Claims, 7 Drawing Sheets

(56) References Cited

U.S. PATENT DOCUMENTS

| | | | | |
|---|---|---|---|---|
| 6,633,923 | B1* | 10/2003 | Kukura | G06F 9/465 709/203 |
| 6,654,907 | B2* | 11/2003 | Stanfill | G06F 11/1458 712/221 |
| 7,426,661 | B2* | 9/2008 | Schaefer | G06F 11/0715 714/38.1 |
| 8,156,421 | B2* | 4/2012 | Chhajer | G06F 17/30306 715/227 |
| 8,239,554 | B2* | 8/2012 | Chong | H04L 65/1043 709/220 |
| 8,259,628 | B2* | 9/2012 | El Zur | H04W 4/001 370/252 |
| 8,260,803 | B2* | 9/2012 | Hsu | G06F 17/30445 707/769 |
| 8,504,522 | B2* | 8/2013 | Wu | G06F 11/3495 707/634 |
| 8,589,733 | B2* | 11/2013 | Di Domenico | G06F 11/1441 714/24 |
| 8,732,306 | B2* | 5/2014 | Chincisan | H04L 1/1642 370/389 |
| 8,751,682 | B2* | 6/2014 | Chincisan | H04L 1/1642 709/237 |
| 8,903,935 | B2* | 12/2014 | Grant | H04L 67/025 709/212 |
| 8,983,983 | B2* | 3/2015 | Antonysamy | G06F 17/30179 706/12 |
| 9,098,453 | B2* | 8/2015 | Griffith | G06F 11/1458 |
| 9,098,454 | B2* | 8/2015 | Griffith | G06F 11/1458 |
| 9,451,530 | B2* | 9/2016 | Gunnarsson | H04W 92/20 |
| 9,614,750 | B2* | 4/2017 | O'Neal | H04L 45/02 |
| 2004/0205190 | A1* | 10/2004 | Chong | H04L 65/1043 709/225 |
| 2006/0020858 | A1* | 1/2006 | Schaefer | G06F 11/0715 714/38.1 |
| 2006/0053209 | A1* | 3/2006 | Li | H04L 29/06027 709/217 |
| 2006/0281451 | A1* | 12/2006 | Zur | H04L 63/1458 455/422.1 |
| 2009/0327854 | A1* | 12/2009 | Chhajer | G06F 17/30306 715/227 |
| 2010/0036810 | A1* | 2/2010 | Wu | G06F 11/3495 707/706 |
| 2011/0270855 | A1* | 11/2011 | Antonysamy | G06F 17/30179 707/756 |
| 2012/0078951 | A1* | 3/2012 | Hsu | G06F 17/30516 707/769 |
| 2012/0079323 | A1* | 3/2012 | Chincisan | H04L 1/1642 714/18 |
| 2012/0265837 | A1* | 10/2012 | Grant | H04L 67/025 709/212 |
| 2013/0091379 | A1* | 4/2013 | Taveniku | G06F 11/1469 714/6.3 |
| 2014/0006981 | A1* | 1/2014 | Evans | G06F 8/30 715/762 |
| 2014/0126562 | A1* | 5/2014 | Gunnarsson | H04W 92/20 370/338 |
| 2014/0129521 | A1* | 5/2014 | Marsden | H04W 4/02 707/623 |
| 2014/0369204 | A1* | 12/2014 | Anand | H04L 47/125 370/235.1 |
| 2015/0019494 | A1* | 1/2015 | Griffith | G06F 11/1458 707/649 |
| 2015/0019909 | A1* | 1/2015 | Griffith | G06F 11/1458 714/15 |
| 2015/0172153 | A1* | 6/2015 | Sharma | H04L 69/162 709/224 |
| 2015/0212891 | A1* | 7/2015 | Douros | G06F 9/485 714/15 |
| 2015/0295814 | A1* | 10/2015 | O'Neal | H04L 45/02 709/238 |
| 2016/0191363 | A1* | 6/2016 | Haraszti | H04L 41/0896 709/223 |
| 2017/0303124 | A1* | 10/2017 | Zhang | H04W 12/06 |

OTHER PUBLICATIONS

Stewart, Randall, and Christopher Metz. "SCTP: new transport protocol for TCP/IP." IEEE Internet Computing 5.6 (2001): 64-69.*
Shvachko, Konstantin, et al. "The hadoop distributed file system." Mass storage systems and technologies (MSST), 2010 IEEE 26th symposium on. IEEE, 2010.*
Ghemawat, Sanjay, Howard Gobioff, and Shun-Tak Leung. "The Google file system." ACM SIGOPS operating systems review. vol. 37. No. 5. ACM, 2003.*
"Apache Kafka", http://katka.apache.org/documentation. html#basic_ops_restarting, [retrieved Apr. 7, 2016].
"Apache Storm Version:0.10.0: Concepts", Apache Software Foundation, 2015; https://storm.apache.org/documentation/Concepts.html, [retrieved Apr. 7, 2016].
"IBM WebSphere MQ information center, Version 7.5 Operating Systems: Starting and stopping a queue manager"; IBM, Apr. 24, 2016; http://www-01.ibm.com/support/knowledgecenter/SSFKSJ_7.5.0/com.ibm.mq.adm.doc/q020580_. htm, [retrieved May 13, 2016].
"Oracle Fusion Middleware Oracle Fusion Middleware WebLogic Scripting Tool Command Reference: 3 WLST Command and Variable Reference", Oracle Help Center, 2015; https://docs.oracle.com/middleware/11119/wls/WLSTC/reference.htm#WLSTC454, [retrieved Apr. 7, 2016].
"Stream Control Transmission Protocol", the IETF Trust, Sep. 2007.
"Streaming Replication", Wikipedia, Feb. 3, 2016; https://wiki.postgresql.org/wiki/Streaming_Replication, [retrieved Apr. 7, 2016].

* cited by examiner

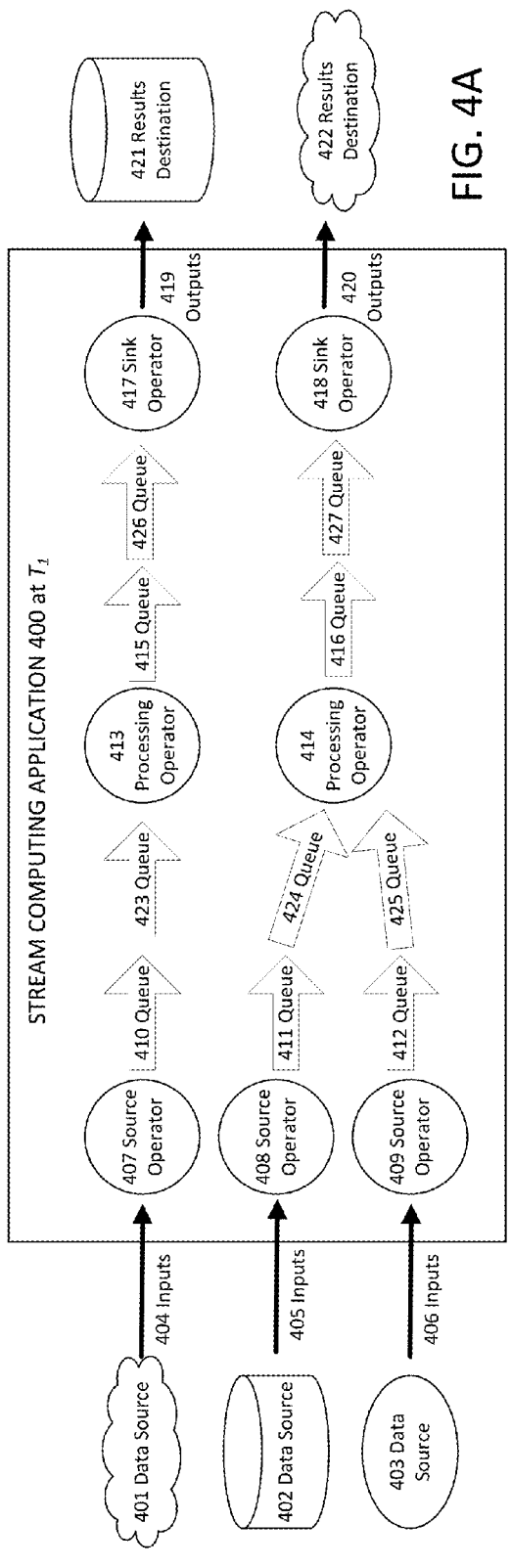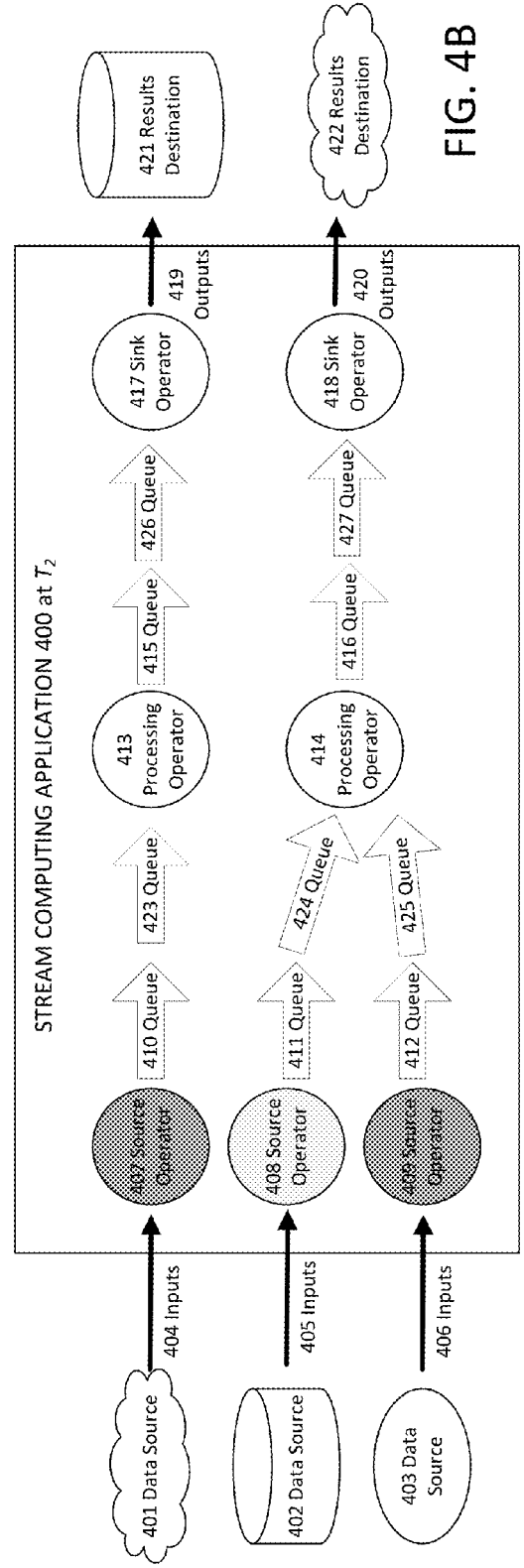

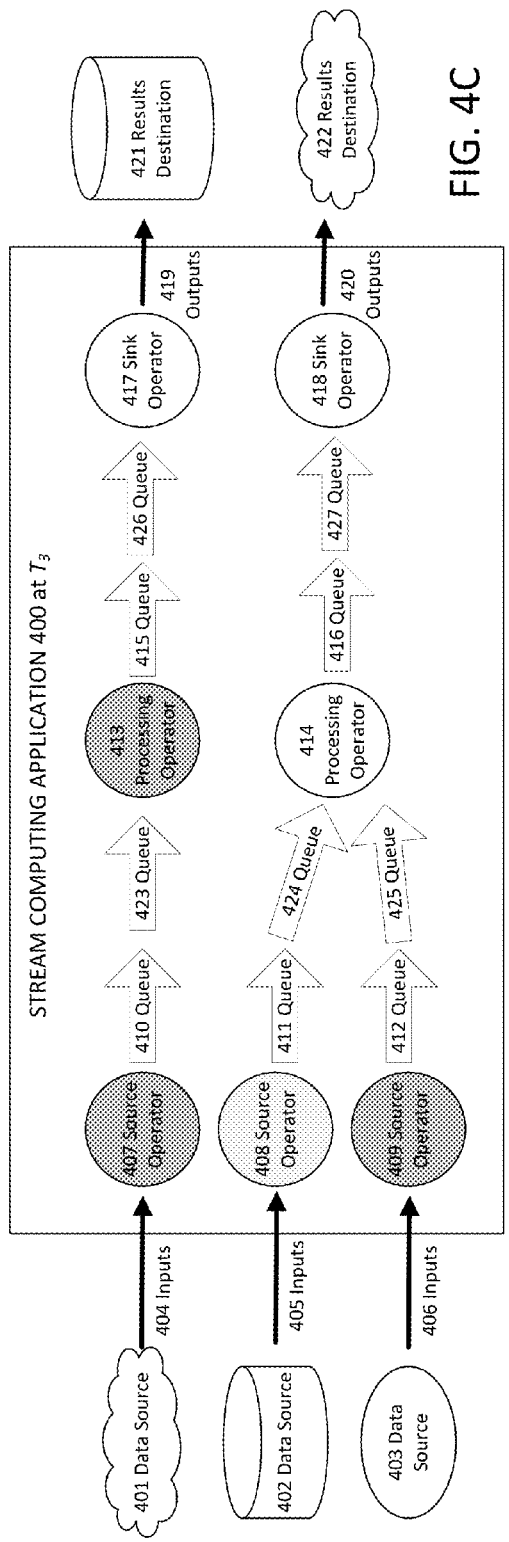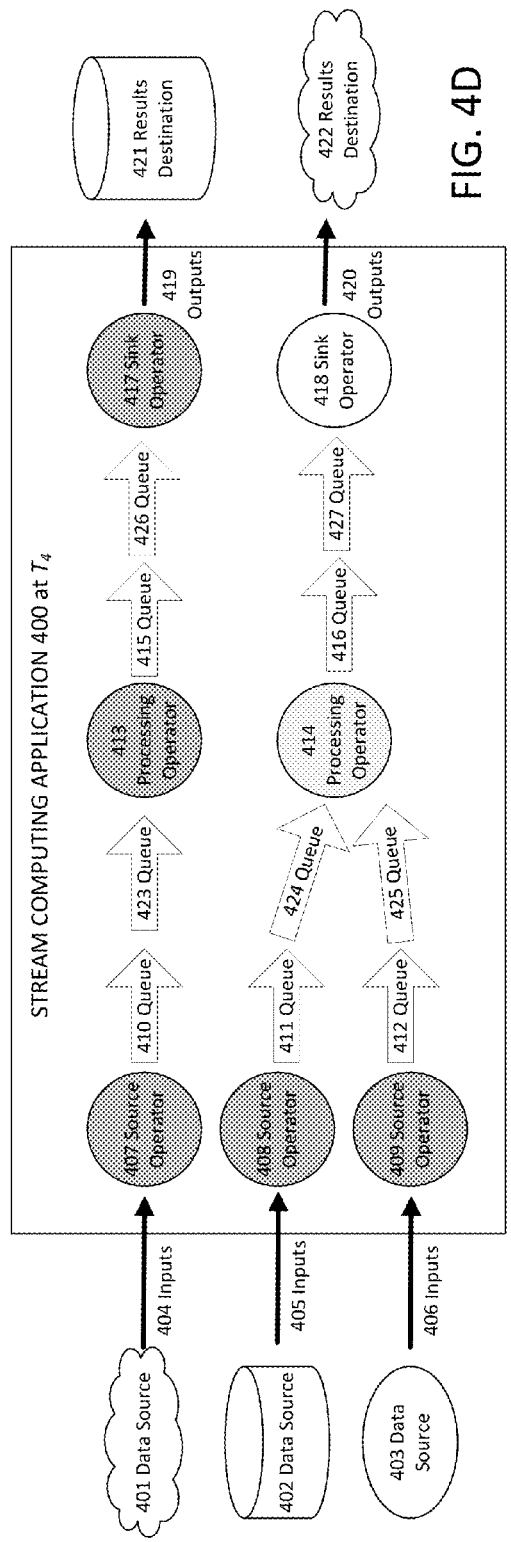

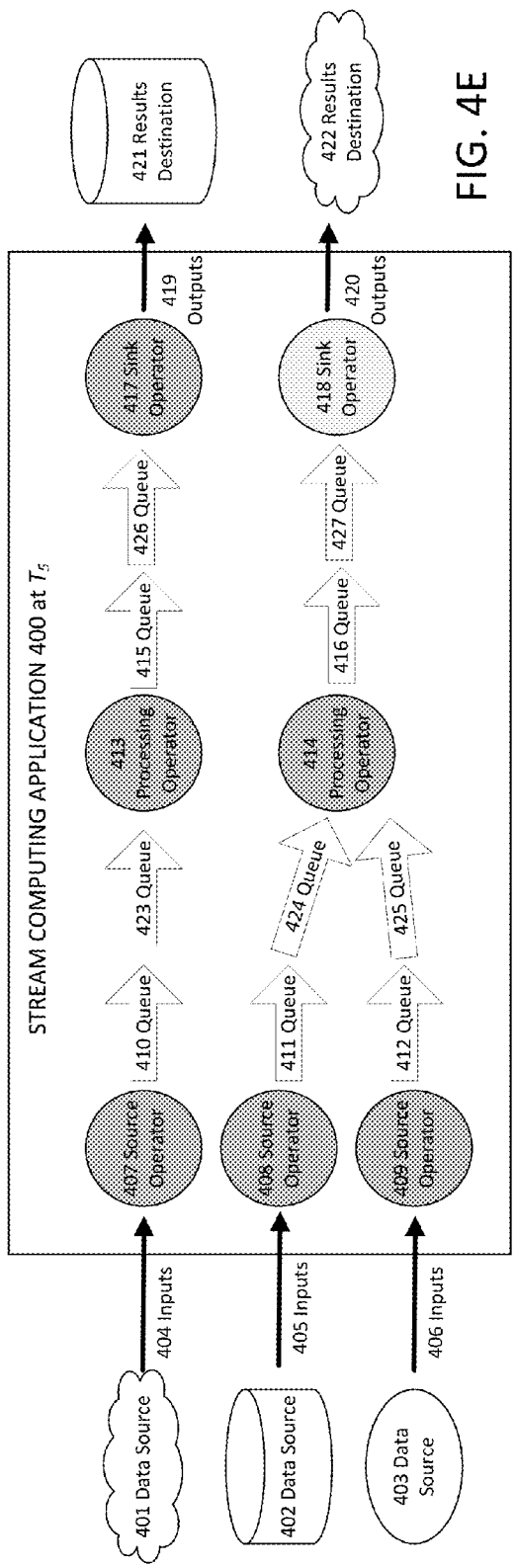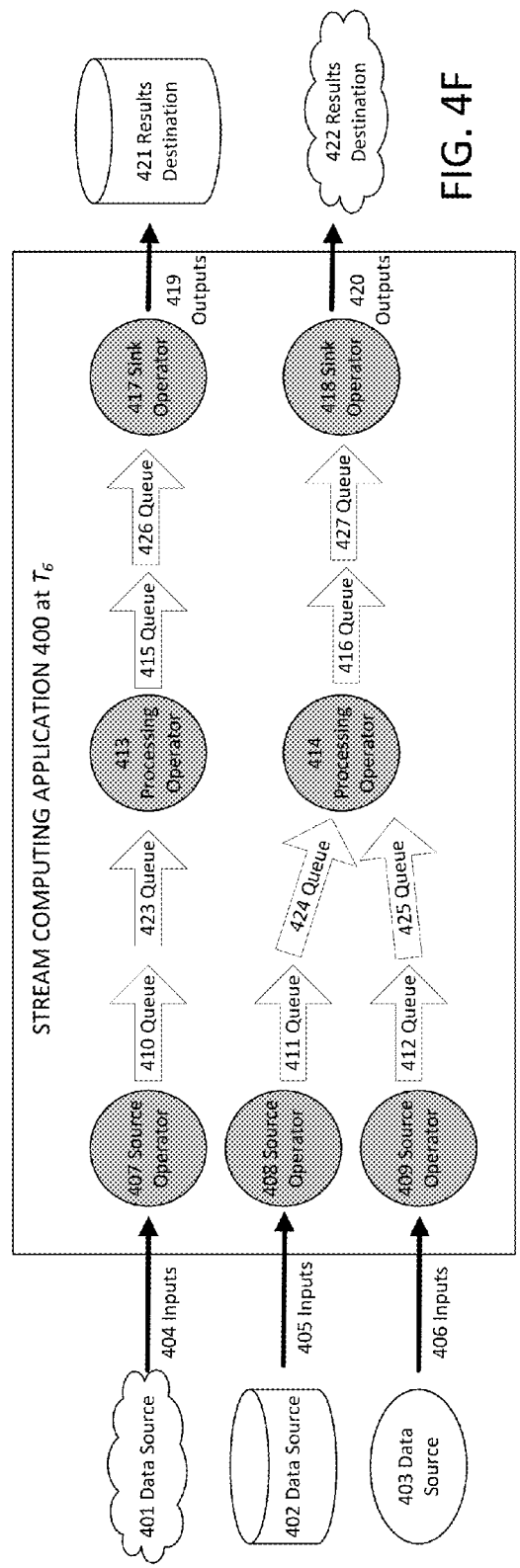

STREAM COMPUTING APPLICATION SHUTDOWN AND RESTART WITHOUT DATA LOSS

BACKGROUND

A stream computing system is a high-performance computer system that hosts applications which process multiple data streams from many sources live. On occasion, a stream computing application must be shutdown and restarted in order to make modifications or updates. While stream computing systems and applications running on these systems are optimized for continuous data processing, they lack the ability to gracefully process already inputted data through to completion prior to a shutdown of a stream computing application. This may result in gaps in data processing when applications are restarted. While in some applications, this potential data loss may be acceptable, in other applications the potential loss of data may be an unacceptable risk.

In one existing approach, the inputting of data into a particular stream computing application may be stopped prior to shutdown. However, this approach does not guarantee a lack of data loss or that already inputted data will be processed to completion prior to shutdown. In another existing approach, a two-phase shutdown process is used, where the shutdown is delayed for a certain period of time after the inputting of data into a stream computing application is stopped. However, this approach provides no guarantee that a correct duration for delaying the shutdown is used. A delay that is too short will result in data loss, while a delay that is too long will adversely impact system availability.

SUMMARY

Disclosed herein is a method for a stream computing application shutdown, and a computer program product as specified in the independent claims. Embodiments of the present invention are given in the dependent claims. Embodiments of the present invention can be freely combined with each other if they are not mutually exclusive.

According to an embodiment of the present invention, in a stream computing application shutdown, a shutdown message is received by a source operator of the stream computing application. In response to receiving the shutdown message, the source operator stops acquiring data from one or more external sources, sends any cached data to an output queue of the source operator, sends a shutdown message to the output queue of the source operator, and sends the cached data and the shutdown message in the output queue of the source operator to an input queue of at least one other operator of the stream computing application. After sending the data and the shutdown message to the output queue of the source operator, the source operator terminates. In response to receiving the shutdown message in the input queue of the other operator, the other operator completes the processing of data in the input queue of the other operator, and sends any outputs from the processing of the data in the input queue of the other operator to one or more output destinations. After sending the outputs, the other operator terminates.

BRIEF DESCRIPTION OF THE DRAWINGS

FIGS. 4A-4F illustrates data flow graphs for an example stream computing application termination according to embodiments of the present invention.

DETAILED DESCRIPTION

Figure 1:
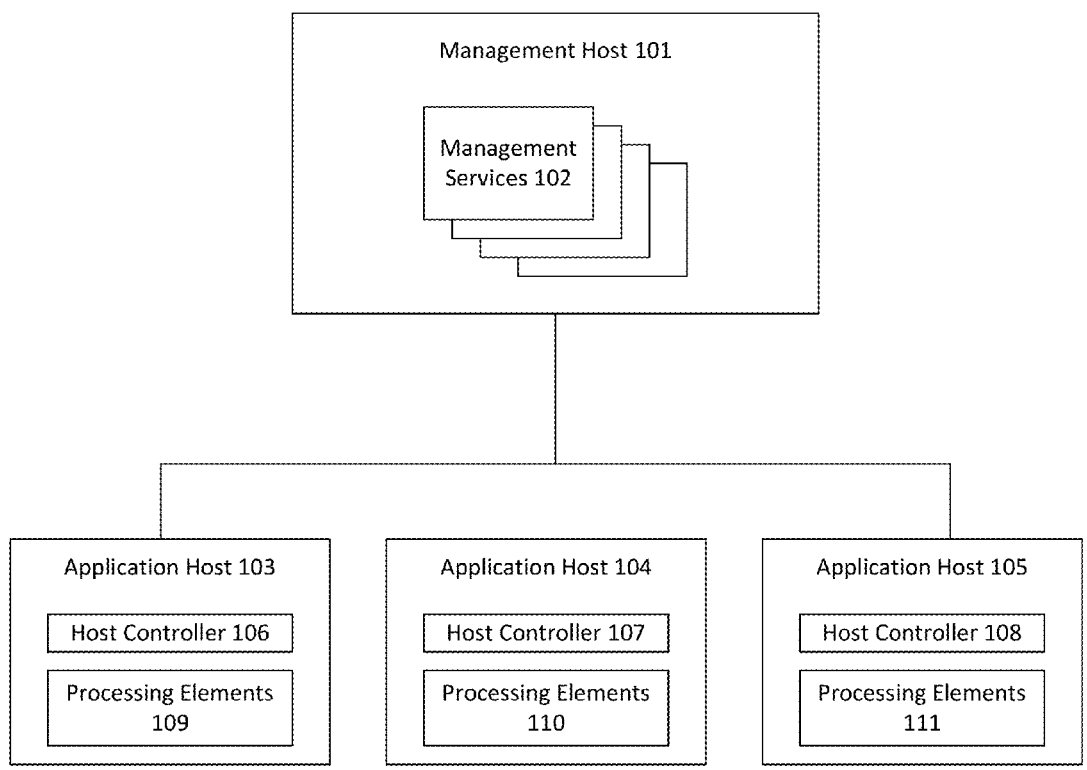
FIG. 1 illustrates a stream processing system according to embodiments of the present invention.

FIG. 1 illustrates a stream processing system according to embodiments of the present invention. The stream processing system is a collection of components and services that are deployed and monitored across a single host computer or a set of integrated host computers or "cluster". Each host computer may each be implemented as a computer system, as described below with reference to FIG. 5. For exemplary purposes, a single instance of a stream processing system is illustrated. The system includes a management host 101 that runs management services 102 that make up the stream computing environment and a plurality of application hosts 103-105 that run stream computing applications. Each application host 103-105 comprises a host controller 106-108, which carries out job requests made by the management host 101, including starting, stopping, and monitoring processing elements 109-111. A processing element 109-111 comprises operators and streams relationships that make up a stream computing application. Operators are encapsulated code that performs a specific process, and stream computing applications are built using these operators. A stream computing application acts as a query that runs continuously without change. The data of interest within a stream is defined and then processed as it flows by the application. The stream computing application workflow may be represented as a data flow graph supported by the underlying stream processing system, as described further below.

Embodiments of the present invention introduces a shutdown message into the input queues of operators of a stream computing application. The operators of the stream computing application continue processing data until they receive shutdown messages on their input queues. The operators, when applicable, will then send shutdown messages to their corresponding output queues and then terminate. The shutdown messages thus cascade through the operators of the stream computing application until the operators have terminated. In this manner, a stream computing application may be shut down while ensuring that any already inputted data is processed to completion, thus avoiding data loss.

Figure 2:
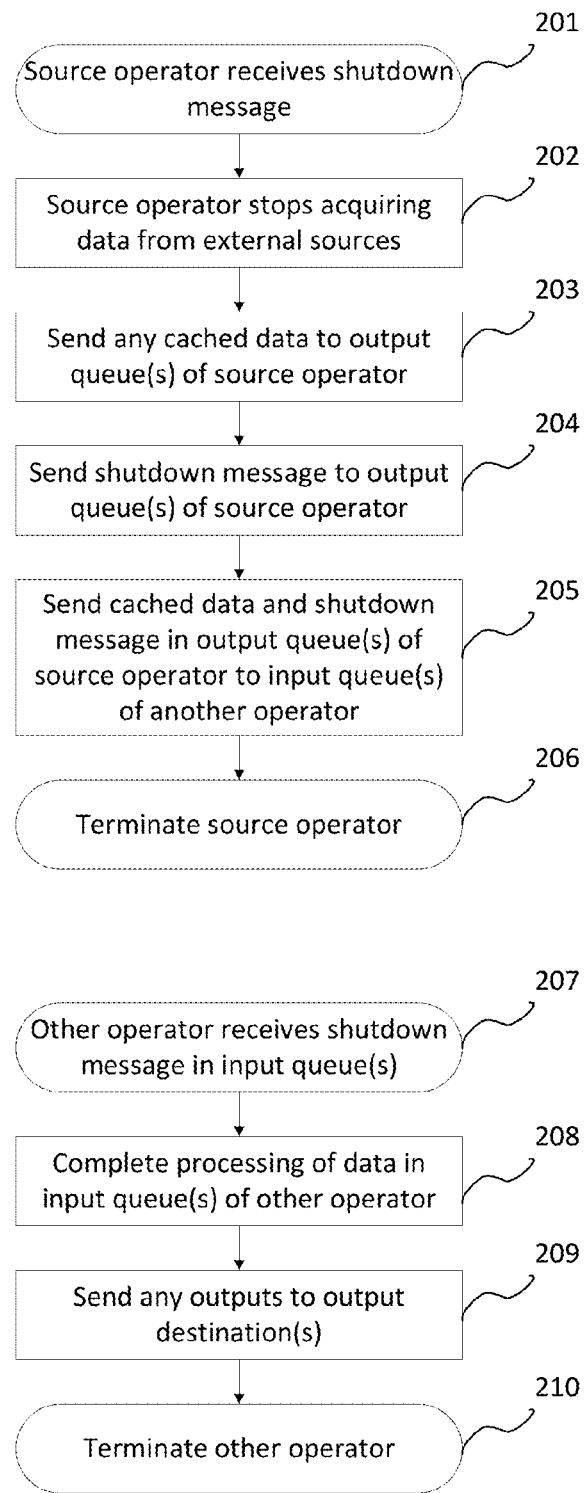
FIG. 2 illustrates a method for stream computing application shutdown according to embodiments of the present invention.

FIG. 2 illustrates a method for stream computing application shutdown according to embodiments of the present invention. According to an illustrative embodiment, a source operator of a stream computing application receives a shutdown message (201). A source operator is an operator of the stream computing application that acquires original data from one or more external sources. In an illustrative embodiment, the shutdown message is sent to the source operator by the management host 101. In response to receiving the shutdown message, the source operator stops acquiring data from the external sources (202). The source operator sends any cached data to the output queue(s) of the source operator (203), and then sends the shutdown message(s) to the output queue of the source operator (204). The source operator sends the cached data and the shutdown message in its output queue(s) to the input queue(s) of at least one other operator of the stream computing application (205). Once the source operator sends the cached data and the shutdown message(s), the source operator terminates (206).

In response to receiving the shutdown message in the input queue(s) of the other operator (207), the other operator completes the processing of the data in the input queue(s) of the other operator (208) and sends any output to one or more predetermined destinations (209), and then sends the shutdown message(s) to the output queue of the other operator. The other operator then terminates (210).

Figure 3:
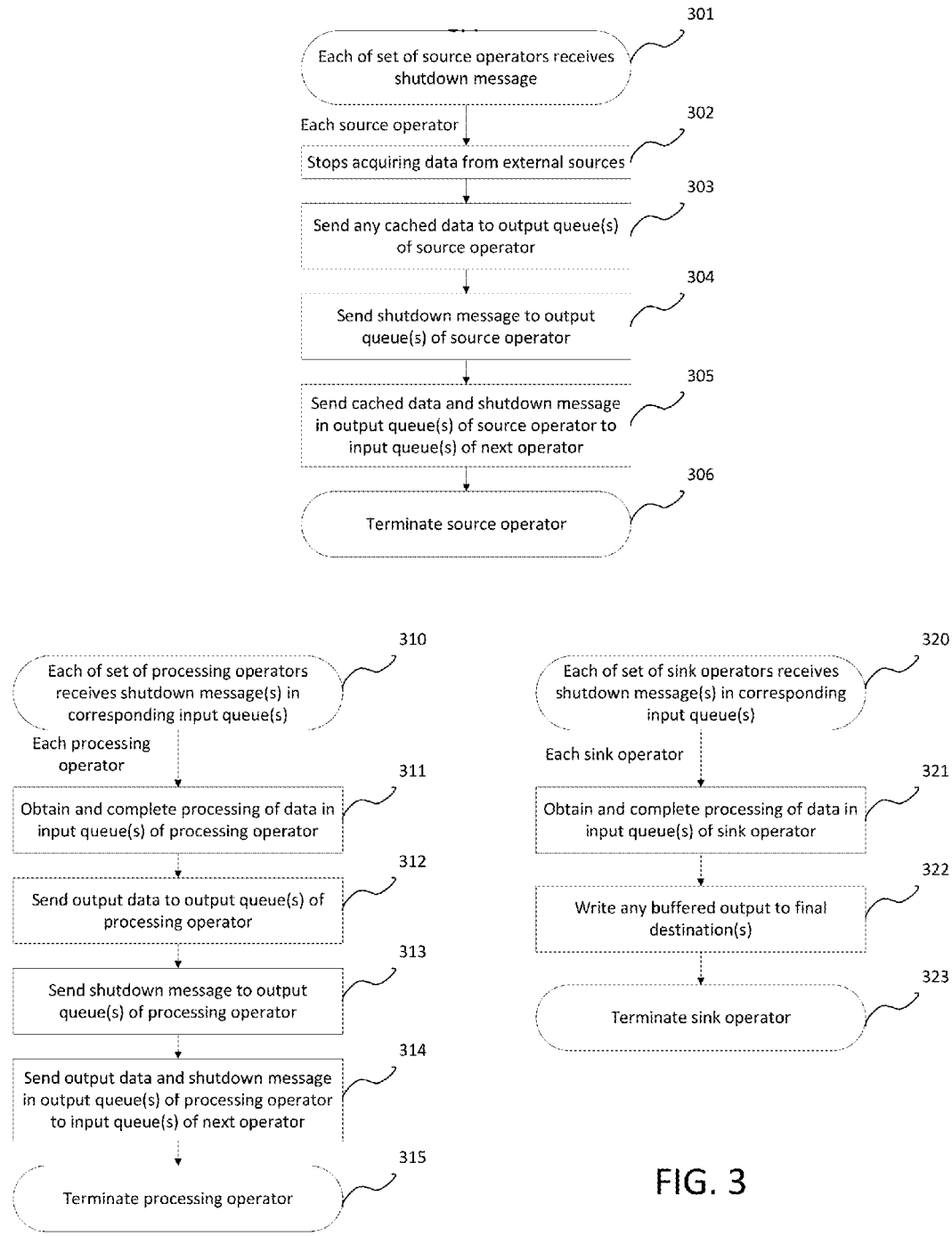
FIG. 3 illustrates in more detail the method for stream computing application shutdown involving source, processing, and output operators, according to embodiments of the present invention.

In an illustrative embodiment, the stream computing application contains different operator types, including source, processing, and sink operators. FIG. 3 illustrates in more detail the method for stream computing application shutdown involving source, processing, and output operators, according to embodiments of the present invention. Source operators receive original data from one or more external sources and are coded to monitor for a shutdown message. In an illustrative embodiment, to shut down a stream computing application, the management host 101 sends a shutdown message to the set of source operators of the stream computing application. Upon receiving the shutdown message (301), each source operator initiates a shutdown sequence, which comprises: stops acquiring data from the external sources (302); sends any cached data to one or more output queues of the source operator (303); sends the shutdown message to each output queue of the source operator (304); sends the cached data and the shutdown message in the output queue(s) of the source operator to the input queues(s) of the next operator (305). After sending the cached data and the shutdown message(s), the source operator terminates (305). For example, a source operator may be coded to scan one or more directories for new or modified files. The source operator receives the shutdown message while actively scanning directories. In response, the source operator completes its scan of the current directory and then initiates the illustrated shutdown sequence. The decision whether to initiate the shutdown sequence during the scanning of the current directory, after the scanning of the current directory, or after the scanning of all directories may be implemented as a parameter of the source operator.

Processing operators both receive data from and send data to other operators in the stream computing application. Each of a set of processing operators is coded to monitor its corresponding input queues for shutdown messages. Upon receiving the shutdown message in the corresponding input queues of each of the set of processing operators (310), each processing operator initiates a shutdown sequence, which comprises: obtains and completes the processing of data in the input queue(s) of the processing operator (311); sends output data to one or more output queues of the processing operator (312); sends the shutdown message to each of the output queue(s) of the processing operator (313); and sends the output data and the shutdown message in the output queue(s) of the processing operator to the input queue(s) of the next operator(s) (314). After sending the output data and the shutdown message(s), the processing operator terminates (315). For example, a processing operator may be coded to implement file reading by accepting file names on its input queue and sending the content of the files to its output queues. This processing operator will run continuously until it receives a shutdown message on its input queue. In response to receiving the shutdown message, the processing operator processes the file list in its input queue, finishes sending the data from the most recent file to its output queue, sends a shutdown message on its output queue, and then terminates. The decision whether the processing operator will process to the end of the file in its input queue or stop the processing of the file before its end may be implemented as a parameter of the processing operator. For another example, a processing operator may implement a SQL join of data from two input queues. This processing operator will run continuously and perform the SQL join on input data of either input queue until receiving a shutdown message on both of its input queues.

Sink operators receive data from other operators in the stream computing application but do not send data to other operators. Each of a set of sink operators is coded to monitor its corresponding input queues for a shutdown message. Upon receiving the shutdown message in each of the corresponding input queues of each of the set of sink operators (320), each sink operator initiates a shutdown sequence, which comprises: obtains and completes the processing of data in the input queue(s) of the sink operator (321); writes any buffered output to one or more final destinations (322); and after writing any buffered output, terminates (323). For example, a sink operator may be coded to write the stream computing application's results into a Hadoop file system based on a single input queue. This sink operator includes the buffering of data in memory until a specific threshold is reached, such as a number of bytes, number of records, elapsed time, changes in data values in the records, etc. In response to receiving the shutdown message in its input queue, this sink operator will flush any currently buffered data into the Hadoop file system and then terminates.

In this illustrative embodiment, when an operator has multiple input queues, the operator initiates the shutdown sequence after receiving a shutdown message in each of its input queues. When an operator has multiple output queues, the operator will forward a shutdown message to each of its output queues prior to terminating.

FIGS. 4A-4F illustrates data flow graphs for an example stream computing application termination according to embodiments of the present invention. The stream computing application 400 receives data from external data sources 401-403. The external data sources 401-403 at the left of the graph represents a combination of source systems that sends data to the stream computing application 400 and sources where the streaming data is pulled by the stream computing application 400. The destinations 421-422 for the results of the stream computing application 400 are illustrated at the right side of the diagram. The stream computing application 400 includes a set of source operators 407-409, a set of processing operators 413-414, and a set of sink operators 417-418. Source operator 407 acquires inputs 404 from data source 401 and has an output queue 410. Source operator 408 acquires inputs 405 from data source 402 and has an output queue 411. Source operator 409 acquires inputs 406 from data source 403 and has an output queue 412. Processing operator 413 has an input queue 423, which receives data from output queue 410 of source operator 407, and an output queue 415. Processing operator 414 has two input queues 424-425, which receive data from output queues 411-412 of source operators 408-409, and an output queue 416. Sink operator 417 has an input queue 426 for receiving data from output queue 415 of processing operator 413 and sends any buffered outputs 419 to results destination 421. Sink operator 418 has an input queue 427 for receiving data from output queue 416 of processing operator 414 and sends any buffered outputs 420 to results destination 422.

FIG. 4A illustrates the stream computing application termination method at time $T_1$, where a shutdown message has been sent to each source operator 407-409 (301, FIG. 3). In response, each source operator 407-409 initiates the shutdown sequence.

FIG. 4B illustrates the stream computing application termination method at time $T_2$, after the shutdown sequence has been initiated for each of the set of source operators 407-408. At $T_2$, source operators 407 and 409 stops acquiring data from data sources 401 and 403, sends any cached data to their corresponding output queues 410 and 412, sends the shutdown messages to their corresponding output queues 410 and 412, and sends the cached data and the shutdown message in the output queues 410 and 412 to the input queues 423 and 425 of processing operators 413 and 414 (see 302-305, FIG. 3). After sending the data and the shutdown messages to their corresponding output queues 410 and 412, the source operators 407 and 409 terminate (see 306, FIG. 3). Also at $T_2$, the processing operator 413 has not yet responded to the shutdown message received in its input queue 423. Source operator 408 has initiated the shutdown sequence but has not yet sent the shutdown message to its output queue 411. Since the processing operator 414 has not yet received a shutdown message in each of its input queues 424-425, the processing operator 414 has not initiated the shutdown sequence.

FIG. 4C illustrates the stream computing application termination method at time $T_3$. At $T_3$, the processing operator 413 responds to the shutdown message in its input queue 423 by obtaining and completing the processing of the existing data in its corresponding input queue 423, sending its output data to its output queue 415, sending a shutdown message on its output queue 415, and sending the output data and the shutdown message in its output queue 415 to the input queue 426 of the sink operator 417 (311-314, FIG. 3). After sending the output data and the shutdown message to its output queue 415, the processing operator 413 terminates (315, FIG. 3). Also at $T_3$, source operator 408 continues its current processing and has not yet sent the shutdown message on its output queue 411. Since the processing operator 414 has not yet received a shutdown message in each of its input queues 424-425, the processing operator 414 has not initiated the shutdown sequence.

FIG. 4D illustrates the stream computing application termination method at time $T_4$. At $T_4$, source operator 408 sends the cached data to its output queue 411, sends the shutdown message to its output queue 411, and sends the cached data and the shutdown message in its output queue 411 to the input queue 424 of processing operator 414 (303-305, FIG. 3). After sending the cached data and the shutdown message to its output queue 411, the source operator 408 terminates (306, FIG. 3). Each of the set of source operators 407-409 have now completed its shutdown sequence. The sink operator 417, in response to receiving the shutdown message in its input queue 426, obtains and completes the processing of the data in its input queue 426 and writes the buffered output 419 to the results destination 421 (321-322, FIG. 3). After writing the output, the sink operator 417 terminates (323, FIG. 3). Also at $T_4$, the processing operator 414, in response to receiving the shutdown message in each of its input queues 424-425, initiates the shutdown sequence but has not yet sent the shutdown message to its output queue 416.

FIG. 4E illustrates the stream computing application termination method at time $T_5$. At $T_5$, the processing operator 414 obtains and completes the processing of data in its input queues 424-425, sends the output data to its output queue 416, sends the shutdown message to its output queue 416, and sends the output data and the shutdown message in its output queue 416 to the input queue 427 of the sink operator 418 (311-314, FIG. 3). After sending the output data and the shutdown message to its output queue 416, the processing operator 414 terminates (315, FIG. 3). Each of the set of processing operators 413-414 have now completed the shutdown sequence. Also at $T_5$, the sink operator 418 receives the shutdown message in its input queue 427, and in response, is in the process of obtaining and completing the processing of data in its input queue 427.

FIG. 4F illustrates the stream computing application termination method at time $T_6$. At $T_6$, the sink operator 418 completes the processing of the data in its input queue 427 and writes the buffered output 420 to the results destination 422 (321-322, FIG. 3). After writing the output, the sink operator 418 terminates (323, FIG. 3). At $T_6$, each sink operator 417-418 has completed the shutdown sequence. Each operator of the stream computing application 400 is now shutdown without the data loss on any of the input queues, output queues, or buffers. The stream computing application 400 can then be restarted after any modifications and updates.

Although the illustrative embodiments of the present invention described above sends a shutdown message to each input queue of a set of operators, the shutdown sequence may optionally be implemented in less than all of the input queues in the stream computing application without departing from the spirit and scope of the present invention. In one such alternative embodiment, certain input queues may be flagged as "non-critical", where the loss of data in these input queues is considered to be acceptable. The operators corresponding to non-critical input queues may proceed to termination immediately upon receiving a shutdown message, without waiting to complete the processing of any existing data in the input queue.

Figure 5:
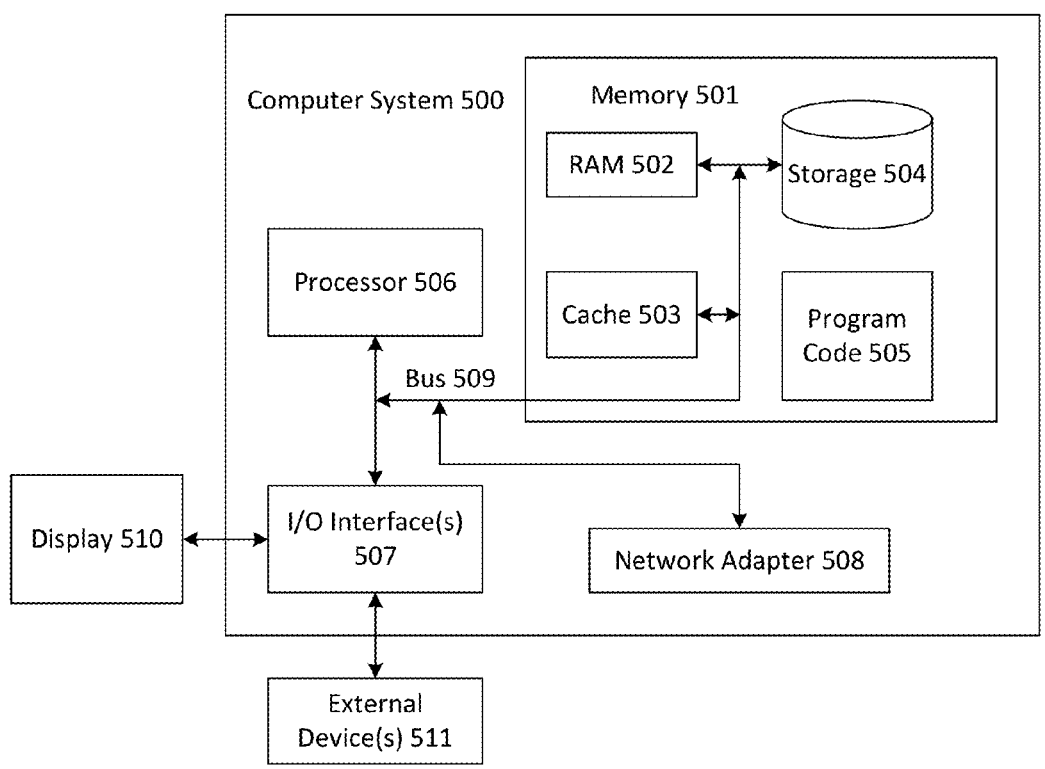
FIG. 5 illustrates a computer system for implementing embodiments of the present invention.

FIG. 5 illustrates a computer system for implementing embodiments of the present invention. The computer system 500 is operationally coupled to a processor or processing units 506, a memory 501, and a bus 509 that couples various system components, including the memory 501 to the processor 506. The bus 509 represents one or more of any of several types of bus structure, including a memory bus or memory controller, a peripheral bus, an accelerated graphics port, and a processor or local bus using any of a variety of bus architectures. The memory 501 may include computer readable media in the form of volatile memory, such as random access memory (RAM) 502 or cache memory 503, or non-volatile storage media 504. The memory 501 may include at least one program product having a set of at least one program code module 505 that are configured to carry out the functions of embodiment of the present invention when executed by the processor 506. The computer system 500 may also communicate with one or more external devices 511, such as a display 510, via I/O interfaces 507. The computer system 500 may communicate with one or more networks via network adapter 508.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for a stream computing application shutdown, comprising:
  receiving a shutdown message by a source operator of the stream computing application;
  in response to receiving the shutdown message by the source operator:

stop acquiring data from one or more external sources by the source operator;
sending any cached data to an output queue of the source operator;
sending the shutdown message to the output queue of the source operator by the source operator;
sending the cached data and the shutdown message in the output queue of the source operator to an input queue of at least one other operator in the stream computing application; and
after sending the cached data and the shutdown message to the output queue of the source operator, terminating the source operator; and
in response to receiving the shutdown message in the input queue of the at least one other operator:
completing processing of data in the input queue of the at least one other operator by the at least one other operator;
sending any outputs from the processing of the data in the input queue of the at least one other operator to one or more output destinations; and
after sending the outputs by the at least one other operator, terminating the at least one other operator.

2. The method of claim 1, wherein the at least one other operator comprises at least one processing operator, wherein in response to receiving the shutdown message in one or more input queues of the at least one processing operator:
obtaining and completing processing of data in the one or more input queues of the at least one processing operator by the at least one processing operator;
sending, by the at least one processing operator, output data from the processing of the data in the one or more input queues of the at least one processing operator to one or more output queues of the at least one processing operator;
sending, by the at least one processing operator, the shutdown message to the one or more output queues of the at least one processing operator; and
after sending the output data and the shutdown message to the one or more output queues of the at least one processing operator, terminating the at least one processing operator.

3. The method of claim 1, wherein the at least one other operator comprises at least one sink operator, wherein in response to receiving the shutdown message in one or more input queues of the at least one sink operator:
obtaining and completing processing of data in the one or more input queues of the at least one sink operator by the at least one sink operator;
writing any buffered output to one or more predetermined destinations by the at least one sink operator; and
after writing the buffered output by the at least one sink operator, terminating the at least one sink operator.

4. The method of claim 1, wherein the source operator or the at least one other operator comprises a plurality of input queues, wherein the source operator or the at least one other operator responds to the shutdown message after receiving the shutdown message in each of the plurality of input queues.

5. The method of claim 1, the source operator or the at least one other operator comprises a plurality of output queues, wherein the source operator or the at least one other operator sends the shutdown message to each of the plurality of output queues.

6. The method of claim 1, further comprising:
determining whether the input queue of the source operator or of the at least one other operator is flagged with a given parameter; and
in response to determining that the input queue of the source operator or of the least one other operator is flagged with the given parameter, terminating the source operator or the least one other operator immediately in response to receiving the shutdown message.

7. A computer program product for a stream computing application shutdown, the computer program product comprising computer readable storage media having program instructions embodied therewith, the program instructions executable by one or more processors to cause the one or more processors to:
receive a shutdown message by a source operator of the stream computing application;
in response to receiving the shutdown message by the source operator:
stop acquire data from one or more external sources by the source operator;
send any cached data to an output queue of the source operator;
send the shutdown message to the output queue of the source operator by the source operator;
send the cached data and the shutdown message in the output queue of the source operator to an input queue of at least one other operator in the stream computing application; and
after sending the cached data and the shutdown message to the output queue of the source operator, terminate the source operator; and
in response to receiving the shutdown message in the input queue of the at least one other operator:
complete processing of data in the input queue of the at least one other operator by the at least one other operator;
send any outputs from the processing of the data in the input queue of the at least one other operator to one or more output destinations; and
after sending the outputs by the at least one other operator, terminate the at least one other operator.

8. The computer program product of claim 7, wherein the at least one other operator comprises at least one processing operator, wherein in response to receiving the shutdown message in one or more input queues of the at least one processing operator:
obtain and complete processing of the data in one or more input queues of the at least one processing operator by the at least one processing operator;
send, by the at least one processing operator, output data from the processing of the data in the one or more input queues of the at least one processing operator to one or more output queues of the at least one processing operator;
send, by the at least one processing operator, the shutdown message to the one or more output queues of the at least one processing operator; and
after sending the output data and the shutdown message to the one or more output queues of the at least one processing operator, terminate the at least one processing operator.

9. The computer program product of claim 7, wherein the at least one other operator comprises at least one sink operator, wherein in response to receiving the shutdown message in one or more input queues of the at least one sink operator:

obtain and complete processing of the data in the one or more input queues of the at least one sink operator by the at least one sink operator;

write any buffered output to one or more predetermined destinations by the at least one sink operator; and after writing the buffered output by the at least one sink operator, terminate the at least one sink operator.

10. The computer program product of claim 7, wherein the source operator or the at least one other operator comprises a plurality of input queues, wherein the source operator or the at least one other operator responds to the shutdown message after receiving the shutdown message in each of the plurality of input queues.

11. The computer program product of claim 7, the source operator or the at least one other operator comprises a plurality of output queues, wherein the source operator or the at least one other operator sends the shutdown message to each of the plurality of output queues.

12. The computer program product of claim 7, further causing the one or more processors to:

determine whether the input queue of the source operator or of the at least one other operator is flagged with a given parameter; and in response to determining that the input queue of the source operator or of the least one other operator is flagged with the given parameter, terminate the source operator or the least one other operator immediately in response to receiving the shutdown message.

13. A system, comprising:

one or more processors; and computer readable storage media having program instructions embodied therewith, the program instructions executable by the one or more processors to cause the one or more processors to:

receive a shutdown message by a source operator of the stream computing application;

in response to receiving the shutdown message by the source operator:

stop acquire of data from one or more external sources by the source operator;

send any cached data to an output queue of the source operator;

send the shutdown message to the output queue of the source operator;

send the cached data and the shutdown message in the output queue of the source operator to an input queue of at least one other operator in the stream computing application; and after sending the cached data and the shutdown message to the output queue of the source operator, terminate the source operator; and in response to receiving the shutdown message in the input queue of the at least one other operator:

complete processing of data in the input queue of the at least one other operator by the at least one other operator;

send any outputs from the processing of the data in the input queue of the at least one other operator to one or more output destinations; and after sending the outputs by the at least one other operator, terminate the at least one other operator.

14. The system of claim 13, wherein the at least one other operator comprises at least one processing operator, wherein in response to receiving the shutdown message in one or more input queues of the at least one processing operator:

obtain and complete processing of the data in the one or more input queues of the at least one processing operator by the at least one processing operator;

send, by the at least one processing operator, output data from the processing of the data in the one or more input queues of the at least one processing operator to one or more output queues of the at least one processing operator;

send, by the at least one processing operator, the shutdown message to the one or more output queues of the at least one processing operator; and after sending the output data and the shutdown message to the one or more output queues of the at least one processing operator, terminate the at least one processing operator.

15. The system of claim 13, wherein the at least one other operator comprises at least one sink operator, wherein in response to receiving the shutdown message in one or more input queues of the at least one sink operator:

obtain and complete processing of the data in the one or more input queues of the at least one sink operator by the at least one sink operator;

write any buffered output to one or more predetermined destinations by the at least one sink operator; and after writing the buffered output by the at least one sink operator, terminate the at least one sink operator.

16. The system of claim 13, wherein the source operator or the at least one other operator comprises a plurality of input queues, wherein the source operator or the at least one other operator responds to the shutdown message after receiving the shutdown message in each of the plurality of input queues.

17. The system of claim 13, the source operator or the at least one other operator comprises a plurality of output queues, wherein the source operator or the at least one other operator sends the shutdown message to each of the plurality of output queues.

18. The system of claim 13, further causing the one or more processors to:

determine whether the input queue of the source operator or of the at least one other operator is flagged with a given parameter; and in response to determining that the input queue of the source operator or of the least one other operator is flagged with the given parameter, terminate the source operator or the least one other operator immediately in response to receiving the shutdown message.

* * * * *